Oct. 10, 1933.     C. A. CAMPBELL     1,929,576
BOW SPRING MOUNTING FOR THE SLIDE VALVES OF TRIPLE VALVES
Filed Nov. 30, 1932
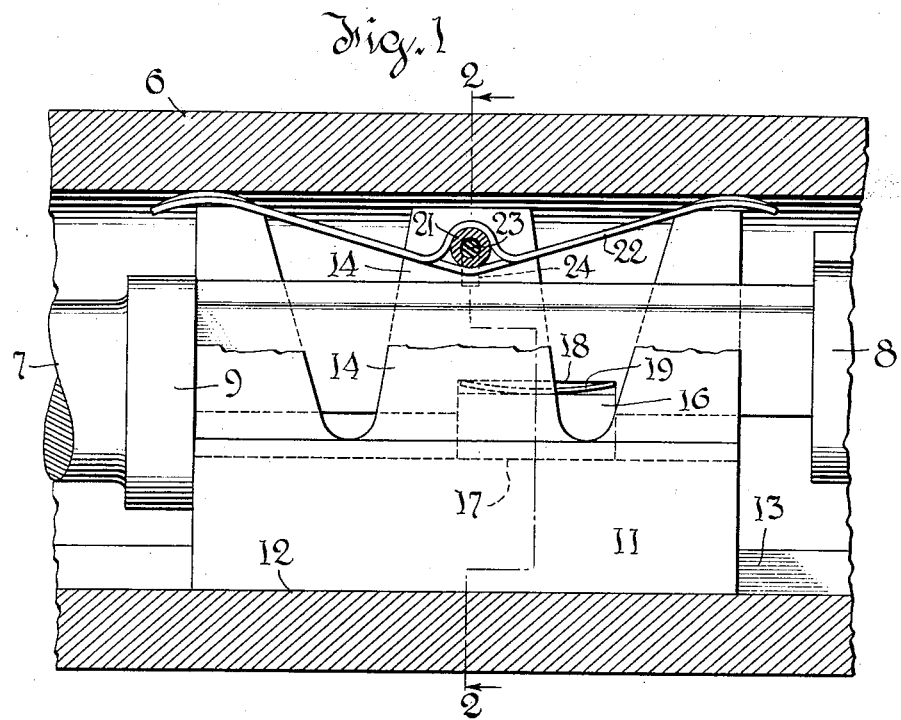
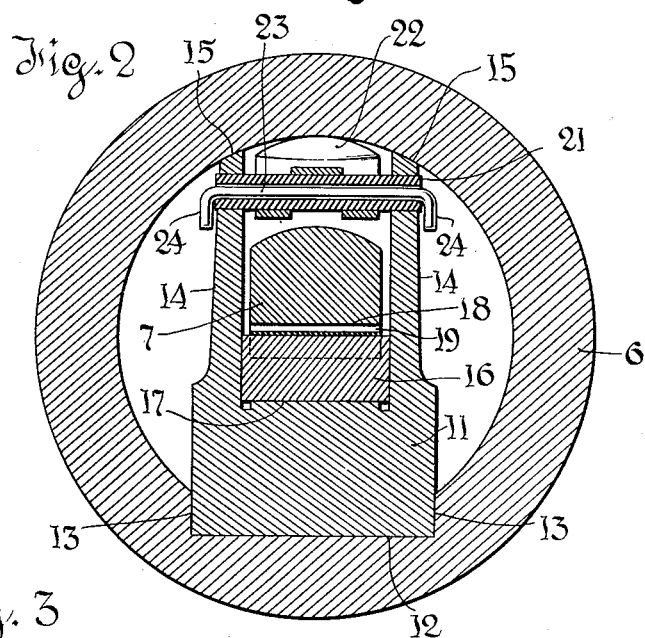
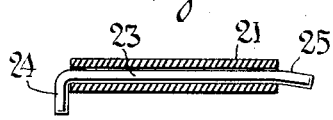
Inventor
Charles A. Campbell
Attorneys Patented Oct. 10, 1933

1,929,576

UNITED STATES PATENT OFFICE 1,929,576

BOW-SPRING MOUNTING FOR THE SLIDE VALVES OF TRIPLE VALVES

Charles A. Campbell, Watertown, N. Y., assignor to The New York Air Brake Company, a corporation of New Jersey Application November 30, 1932
Serial No. 645,066

4 Claims. (Cl. 303—33)

This invention relates to triple valves and particularly to the spring mechanism used for holding the slide valve to its seat.

According to long established practice, the slide valve works in a slide valve chamber formed in a cylindrical brass bushing. A flat seat for the slide valve is broached out in one side of the bushing and serves to confine the slide valve quite closely to right line movement in the direction of the axis of the cylindrical bushing. The slide valve likewise is made of brass and is provided with upstanding wings or lugs between which the graduating valve is closely confined so that it has longitudinal movement in the direction of the axis of the cylindrical bushing. The two valves are actuated by a piston stem which extends longitudinally over both valves between the wings, lost motion relatively to the piston stem being permitted to at least one of the valves. The piston stem is guided at one end by the triple piston, and at the other end by a spider which works in the cylindrical bushing.

It is highly important that the slide valve be closely confined to its seat with which it makes a lapped fit. If the valve were permitted to rise from its seat particles of grit might enter between the valve and its seat and score one or both. For this reason the wings are extended upward into contact with that side of the cylinder bushing opposed to the valve seat, the effect being to confine the valve quite closely to its seat without impairing its freedom of motion.

To exert a definite seating pressure at all times on the valve a bow-spring is pivoted on a fulcrum pin which extends transversely through opposed wings. Furthermore, a leaf or other spring is interposed between the stem and the graduating valve. In this mechanism, as heretofore constructed, the fulcrum pin was a brass rod only slightly longer than the overall width across the two opposed wings, the rod being retained by riveting over its ends. The operation of riveting the ends has been found likely to cause deformation of the wings, that is, the wings are forced toward each other. Furthermore, even if the wings are not distorted in the initial insertion of the pin, they are almost certain to be damaged by being bent inward or outward in the operation of driving out a fulcrum pin, when for any reason this becomes necessary. Deformation of the wings is harmful for two reasons. It increases or decreases, according to the direction of displacement, the clearance between the top of the wings and the interior of the bushing, as will be obvious from an inspection of Fig. 2 of the drawing. Increase of clearance makes it possible for the slide valve to lift while decrease causes it to bind in the bushing. Inward deflection of a wing or both wings causes binding of the graduating valve with the wings. These are frequently the cause of malfunctioning of triple valves.

The present invention provides a simple construction of fulcrum pin which can be quickly inserted and fastened in place without danger of deforming the wings, and which can be quickly removed without danger of deforming the wings. The pin consists of a tube through the bore of which a soft deformable wire is inserted. This wire projects at each end and is bent over into position to engage the outer faces of the wings and prevent withdrawal of the tube.

The preferred embodiment of the invention will now be described with reference to the accompanying drawing, in which,—

Fig. 1 is a fragmentary longitudinal axial section through the valve chamber bushing of a triple valve, the slide valve, graduating valve and piston stem being shown in elevation, certain parts being broken away.

Fig. 2 is a section on the line 2—2 of Fig. 1.

Fig. 3 is a view of the fulcrum pin assembly before insertion, the tubular pin being shown in longitudinal section.

Referring first to Figs. 1 and 2, 6 represents the valve chamber bushing of a triple valve, and 7 represents the triple piston stem, which is of ordinary form and which is guided at its inner (right hand) end by a spider 8 which contacts with the interior of the bushing 6 and is cut-away or fluted at its periphery to permit the free passage of air. The outer or left hand end of the stem 7 is guided by the triple piston, as will be well understood by those skilled in the art.

Between the spider 8 and a collar 9 on the stem 7 a slide valve 11 is mounted so as to have lost motion relatively to the stem 7. This slide valve works on a seat 12 formed by broaching out a portion of the bushing. In this way the valve 11 is confined laterally by shoulders 13 formed in the bushing. Along its lateral edges the slide valve is provided with parallel flanges or wings 14 which project across the interior of the bushing to contact with the bushing as indicated at 15. The upper edges of the wings are machined to conform to the interior circular contour of the bushing.

Closely confined between the wings 14 is the graduating valve 16 which works on a seat 17 formed on the back of the slide valve 11. The valve 16 is held in a notch 18 formed in the stem 7 and is urged against the seat 17 by a leaf spring 19. A tubular fulcrum pin 21 extends through opposed wings 14 and carries the usual bow-spring 22 which contacts at its ends with the interior surface of the bushing. The pin 21 is retained by a deformable wire 23 which is inserted longitudinally through the bore of the pin 21. It projects at each end from the tubular pin and is bent laterally so as to preclude withdrawal of the pin by engagement of the ends of the wire with the wings 14. The bent portions are indicated at 24.

In making up the pin assembly the parts are arranged as shown in Fig. 3. The wire 23 is inserted through the bore of the pin 21. One end is bent at right angles, as indicated at 24 in Fig. 3. The other end is bent laterally slightly, as indicated at 25 in Fig. 3, the bend being sufficient to prevent withdrawal of the wire, and insufficient to prevent insertion of the tubular pin 21. As a rule the wire 23 is made of soft bronze or copper. The wire may readily be bent into retaining position or may be bent up to free the fulcrum pin without danger of bending the wings 14.

What is claimed is,—

1. The combination of a slide valve having on its back a pair of spaced wings; a tubular fulcrum pin extending through said wings; a bow-spring tiltably mounted on said pin; and a readily deformable wire extending through the bore of said tubular fulcrum pin, and having its end portions bent laterally to retain said pin by engagement with said wings.

2. The combination with a valve chamber bushing having a slide valve seat; a slide valve shiftable on said seat and having spaced wings projecting from its back and adapted to coact with said bushing to prevent substantial separation of said valve from its seat; a tubular fulcrum pin extending through said wings; a bow-spring tiltably mounted on said pin and coacting with said bushing to hold said slide valve against said seat; and a readily deformable wire extending through the bore of said tubular fulcrum pin, and having its end portions bent laterally to retain said pin by engagement with said wings.

3. The combination with a valve chamber bushing having a slide valve seat; a slide valve shiftable on said seat and having spaced wings projecting from its back and adapted to coact with said bushing to prevent substantial separation of said valve from its seat; a graduating valve slidable on the back of said slide valve between said wings, said graduating valve being guided in its motion relatively to the slide valve by said wings; a tubular fulcrum pin extending through said wings; a bow-spring tiltably mounted on said pin and coacting with said bushing to hold said slide valve against said seat; a readily deformable wire extending through the bore of said tubular fulcrum pin, and having its end portions bent laterally to retain said pin by engagement with said wings; a shiftable stem guided in said bushing, engaging said graduating valve to shift the same and having lost motion engagement with said slide valve to shift the slide valve; and a spring reacting between said stem and graduating valve to hold the graduating valve seated on the slide valve.

4. A fulcrum pin assembly for bow-springs of triple slide valves, comprising in combination, a tubular pin; and a deformable wire inserted through the bore of and projecting beyond the ends of said pin, the projecting ends of said wire being bent laterally sufficiently to retain the wire in the pin, and at least one such bent end being so formed as to permit insertion of the end of the pin through a closely fitting aperture.

CHARLES A. CAMPBELL.